April 14, 1953     H. D. RICHARDSON     2,634,503
ANGLE MEASURING TOOL
Filed Aug. 11, 1949     2 SHEETS—SHEET 1
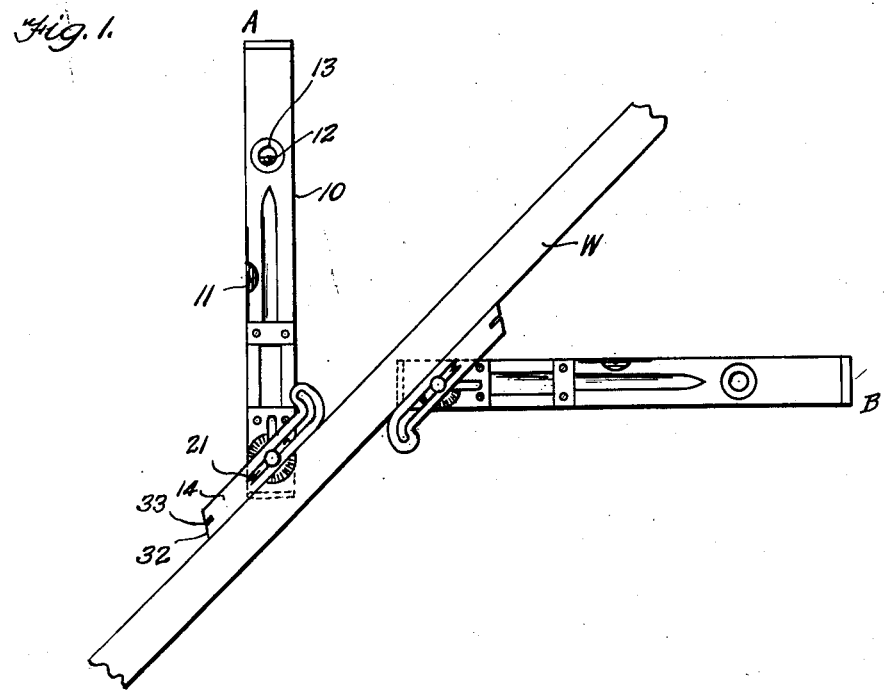
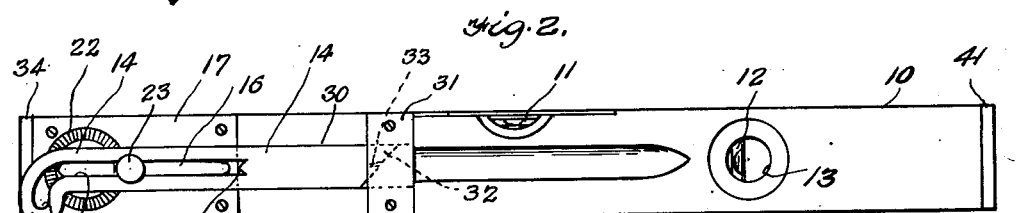
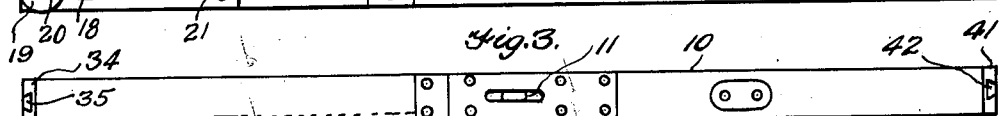
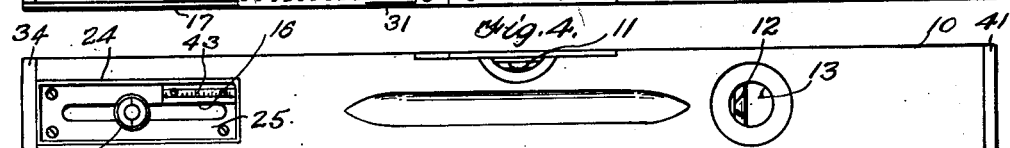
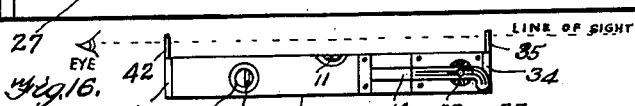
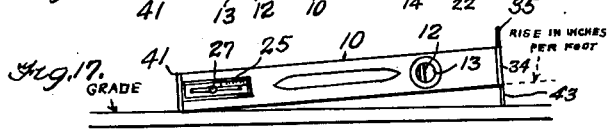
INVENTOR.
HARRY D. RICHARDSON
BY
HIS ATTY.

April 14, 1953 H. D. RICHARDSON 2,634,503
ANGLE MEASURING TOOL
Filed Aug. 11, 1949 2 SHEETS—SHEET 2
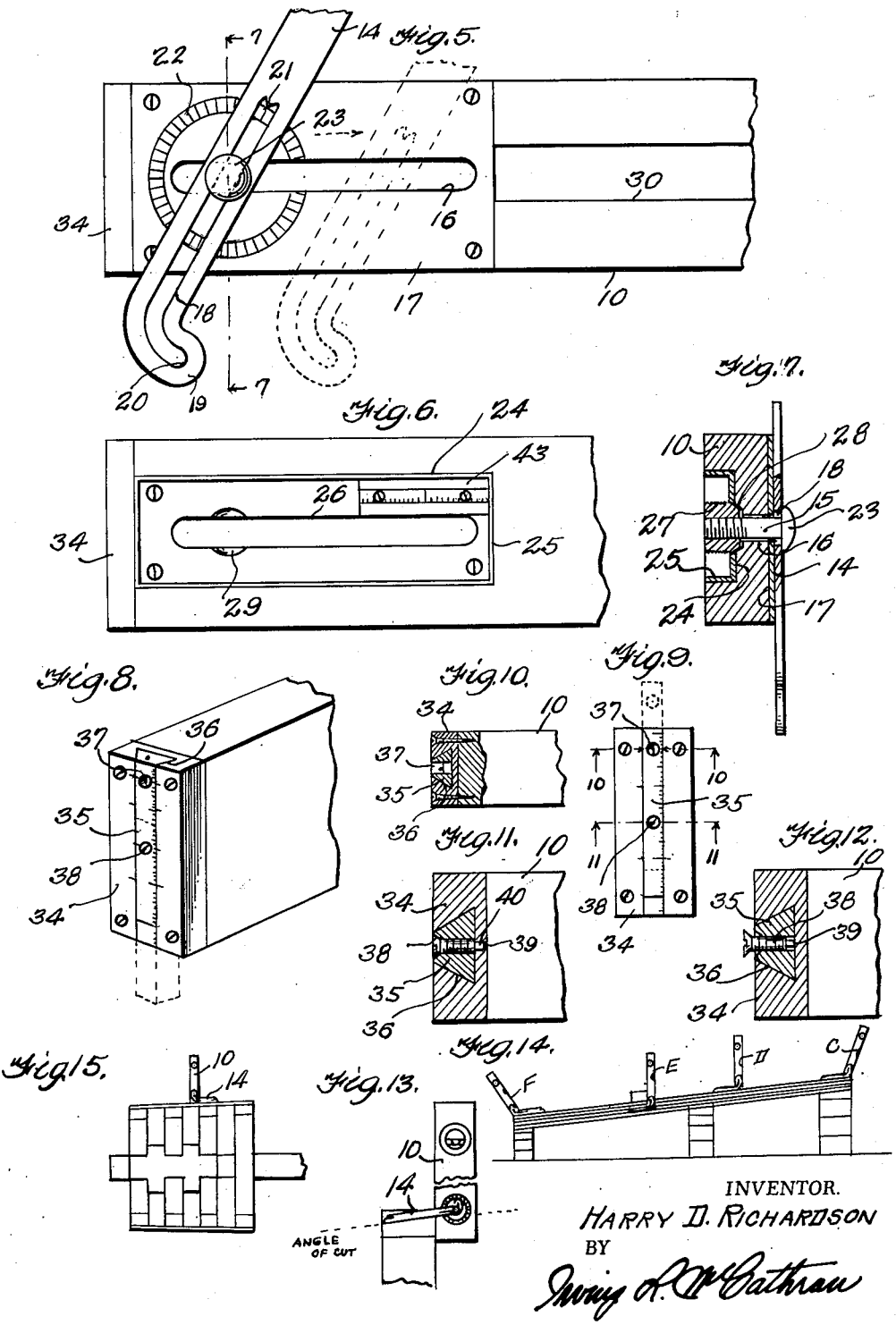
INVENTOR.
HARRY D. RICHARDSON
BY
HIS ATTY.

Patented Apr. 14, 1953

2,634,503

UNITED STATES PATENT OFFICE 2,634,503

ANGLE MEASURING TOOL

Harry Dunreath Richardson, Willards, Md.

Application August 11, 1949, Serial No. 109,680

1 Claim. (Cl. 33—102)

This invention relates to an angle measuring tool, and has for one of its objects the production of a simple and efficient tool for determining the degree or angle of a stem post of a ship and also determining the degree or angle of various places on a ship or in what is referred to by builders of ships as "squaring the round."

A further object of this invention is the production of a simple and efficient tool or instrument for determining the angle in degrees of a piece of work from a perpendicular or a horizontal plane or line.

Another object of this invention is the production of a simple and efficient tool or instrument for use as a sight level in bricklaying, drainage, grading and carpenter work.

A still further object of this invention is the production of a tool for facilitating the measuring of a grade, such for instance to determine the rise in inches per foot.

Other objects and advantages of the present invention will appear throughout the following specification and claim.

In the drawings:

Figure 1 is a side elevational view illustrating the application of two tools or instruments to determine the angle or degrees of a piece of work with respect to a perpendicular and also a horizontal plane;

Figure 2 is a side elevational view of the tool or instrument;

Figure 3 is a top plan view of the tool or instrument;

Figure 4 is a side elevational view of the tool or instrument looking at the opposite side thereof to that shown in Figure 2;

Figure 5 is an enlarged fragmentary side elevational view illustrating the blade-carrying end of the tool;

Figure 6 is a fragmentary side elevational view showing the opposite side of the tool to that shown in Figure 5;

Figure 7 is a vertical sectional view taken on line 7—7 of Figure 5;

Figure 8 is a perspective view of one end of the tool;

Figure 9 is an end elevational view of the tool;

Figure 10 is a transverse sectional view taken on line 10—10 of Figure 9;

Figure 11 is an enlarged transverse sectional view taken on line 11—11 of Figure 9;

Figure 12 is a transverse sectional view similar to Figure 11, showing the adjustable end slide in an adjusted position;

Figure 13 is a fragmentary side elevational view of the tool illustrating the manner of ascertaining the angle of cut or degree of cut for a keel block;

Figure 14 is a side elevational view illustrating the use of the tool in measuring various degrees or angles, such as the degree of the stem post, the drop of the keel, the degree for the filler blocks, the degree of the steering post, and the degree for the sister keel;

Figure 15 is a fragmentary top plan view of a portion of a boat construction, illustrating the manner of taking the degrees of the deck shear, so that both sides will be at the same degree or angle;

Figure 16 is a side elevational view of the tool used as a sight level;

Figure 17 is a side elevational view of the tool used as a grade determining level.

By referring to the drawings, it will be seen that 10 designates the body of the tool or instrument which preferably is rectangular in shape having a longitudinally extending spirit level 11 located at one side edge thereof and a transversely extending spirit level 12 located in an aperture 13 which is formed near one end of the body 10. This constitutes a conventional mounting of spirit levels upon a conventional level or level determining instrument.

A level blade or angle measuring blade 14 is carried by the body 10 near the end thereof opposite to that in which the aperture 13 is formed, as shown in Figure 2, and is engaged by an anchoring screw 15. This screw 15 is slidable longitudinally of the slot 16 which extends longitudinally of one end of the body 10 and bisects the graduated circle 22 set forth in the following description. A metal bearing plate 17 is secured to one face or side of the body 10 and the blade 14 fits flat against the bearing plate 17, as shown in Figure 7. The blade 14 is provided with a longitudinal slot 18 which registers with the slot 16 formed in the body 10. The blade 14 is provided with an angularly extending end 19 and one end of the slot 18 gradually curves into an angularly extending portion 20 within the angularly extending end 19, as shown clearly in Figures 1, 2 and 5. The opposite end of the slot 18 is provided with an indicating pointer 21 which is in direct line with the longitudinal central axis of the blade 14 and slot 18. A 360° graduated circle 22 is formed upon the outer face of the plate 17 and lies directly under the blade 14. The center of this graduated circle 22 is directly in line with the longitudinal axis of the slot 16. The circle may be located near one end of the slot 16, as shown in detail in Figures 2 and 5. An enlarged head 23 is carried by one end of the screw 15 and overhangs the blade 14 to hold the blade 14 in abutting relation against the face of the bearing plate 17, as shown in Figure 7. By placing the screw 15 at the end of the slot 16 nearest the plate 34, and by locating the screw 15 at the end of the angularly extending end 19 of the slot 18, the longitudinal axis of the blade 14 may be offset in the direction of the plate 34 to one side of the screw 15 to place the body of the blade closer to the end of the body 10 of the tool or instrument.

The side of the body 10 opposite the plate 17 preferably is provided with a socket 24 in which is seated a metal box 25. This box 25 is provided with a longitudinal slot 26 which registers with the slot 16. The screw 15 passes through the slots 25 and 26 and a knurled nut 27 is threaded upon the screw 15. The inner end of the nut 27 tapers as at 28, to provide a wedging gripping action against the edges of the slot 26 of the box 25 to lock the screw 15 and the blade 14 in a selected position. The slot 26 is provided with opposite arc-shaped notches 29 in the edges of the slot 26 which are formed on the same axis as the axis of the graduated circle 22 of the plate 17. These notches 29 are adapted to receive the tapered portion 28 of the nut 27 when it is desired to anchor the screw 15 in the exact central position of the graduated circle 22 and secure the blade 14 in a position whereby the longitudinal axis of the blade 14 and the slot 18 bisects the graduated circle 22 at its axis. The blade 14 when mounted as described here, will take a position as shown in Figure 5, and the indicating pointer 21 is adapted to register with the degree marks on the graduated circle 22 to indicate the angle in degrees at which the blade extends relative to the body 10, either from a vertical or from a horizontal level position. It should be noted that by placing the nut 27 within the sunken box 25, the nut 27 will be shielded against contact with foreign objects which might tend to loosen the nut after it has once been adjusted.

The blade 14 may be swung to the desired angle upon the screw 15 and then locked in the desired position by means of the nut 27, and the angle of the blade 14 in degrees relative to the body 10 may be determined by consulting the position of the indicating pointer 21 upon the protractor or graduated circle 22, the screw of course having been first anchored centrally of the axis of the circle 22 by registering the tapered portion 28 of the nut 27 with the sockets 29. The blade 14, when desired, may be shifted longitudinally by loosening the nut 27, and the screw 15 may be adjusted to any desired position within the length of the slot 16. I preferably provide a longitudinal channel 30 in one side of the body 10 in abutting relation at one end with the inner end of the plate 17 to receive the blade 14, as shown in Figure 2. A transverse keeper plate 31 is located at the opposite or far end of the channel 30 under which keeper plate 31 the beveled end 32 of the blade 14 extends when the blade 14 is not in use. The tightened screw 14 by engaging the blade 14 will hold the blade 14 in the keeper plate engaging position when the blade 14 is not in use. The end 31 of the blade 14 is provided with a central longitudinal notch 33, as shown. This notch 33 is in direct line with the indicating pointer 21, to determine the angle of the blade in degrees. A pencil mark may be made on the work to register with the notch 33, to facilitate the marking of the angle or degree of cut on the work.

A metal end plate 34 is secured to one end of the body 10 of the tool or instrument and carries a vane 35 which is slidable longitudinally of the plate 34 to and from an adjusted position. The vane 35 is preferably dove-tail in cross section and fits within a suitable channel 36 extending longitudinally of the plate 34, which channel also is dove-tail in cross section, as shown in detail in Figures 10 to 12 inclusive. The vane 35 may be selectively moved to and from an adjusted position above and below the upper and lower edges of the instrument, such as is illustrated in dotted lines in Figures 8 and 9. The vane 35 is preferably graduated in inches and suitable conventional index registration marks may be provided upon the face of the plate 34 to facilitate the adjustment of the vane 35 to a selected position. The vane 35 is provided with a sighting aperture 37 at one end and having conventional cross wires therein. A locking screw 38 passes transversely through the vane 35 and is provided with a reduced tip 39 for fitting into a socket 40 in the inner face of the channel 36 to lock the vane 35 in an encased position within the channel 36 when the vane 35 is not in use, as shown in Figure 11. However, the vane 35 may be locked in an extended or selected adjusted position by tightening the screw 38 against the inner face of the channel 36 when the vane 35 is moved to such a selected adjusted position where the screw 38 is not in registration with the socket 40. See Figure 12.

A second end plate 41 is carried by the opposite end of the body 10 of the tool or instrument and a vane 42 constructed exactly like the vane 35, is slidably mounted and secured to the plate 41 in a similar manner. The vane 42 also is provided with a sighting aperture at one end similar to the aperture 37 of the vane 35, and the vane 42 also is similarly graduated. Since the vanes 42 and 35 are constructed similarly, it is considered unnecessary to duplicate the illustration set forth in Figures 8 and 9. The vanes 35 and 42 may be adjusted at selected positions shown in Figure 16, and the instrument may be used as illustrated as a sight level for use in bricklaying, drainage, carpenter work, grading, etc. One of the vanes may be adjusted to a selected position shown in Figure 17, and the instrument may be used as a level to determine grade or rise in inches per foot.

A detachable beveled graduated plate 43 is carried within the metal box 25 near one end and to the side of the slot 26. This plate 43 is detachably held in place by means of suitable screws. The plate 43 is adapted to be removed from the metal box 25 and placed in the lower end of the slot 36 above, and to abut the lower end of the vane 35 which extends above the plate 43 to give the elevation of the grade, as shown in Figure 17.

The tool or instrument may be used, as shown in Figure 1, to obtain the angle of the work W in degrees from the perpendicular plane or from the horizontal plane, tool A in Figure 1 giving the degrees from the perpendicular plane and tool B giving the degrees from the horizontal plane. It should be understood that the tool or instrument is adaptable for use in determining various angles in degrees, and may be used efficiently to facilitate the building of boats and the like. In Figures 13, 14 and 15, I have illustrated diametrically a few of the many uses for the improved tool or instrument. In Figure 13, there is shown the manner of taking the degree cut for a keel block with the tool. In Figure 2, tool C illustrates the manner of taking the degree for the stem post, tool D the degree of drop of the keel, tool E the degree for filler blocks, and tool F the degree cut for the steering post. Other degree measurements may be taken in degrees for obtaining the degree for the sister keel, as well as other measurements in degree, but it is considered that the above will be a sufficient description so far as the use of the tool is concerned, since it is not desired to limit the use of the tool to illustrations set forth herein. In Figure 15, however, the tool is shown as used when taking the degree of the deck shear of a boat or ship, so that both sides thereof will be uniform as to degree.

It should be understood that certain detail changes in the construction and arrangement of parts may be employed without departing from the spirit of the invention, so long as such changes fall within the scope of the appended claim.

Having described the invention, what is claimed as new is:

A tool of the class described comprising a body, a bearing plate carried thereby and having a graduated circle formed upon one face thereof, a blade frictionally fitting against said bearing plate, said blade having a longitudinal slot formed therein, said body having a longitudinal slot bisecting said graduated circle, a releasable screw passing through said slots and adapted to be placed at the center of said graduated circle to pivotally and adjustably secure said blade in a central position relative to said graduated circle, and said blade having an indicating point at one end of said slot in direct line with the longitudinal central axis of said blade for registering with a selected graduation of said graduated circle to facilitate the accurate measuring of an angle of the blade in degrees relative to said body when said indicating point registers with a selected graduation of the graduated circle, said blade having an angularly extending end, said slot in said blade having an angularly curved portion extending into said angularly extending end, and said screw being adapted to be extended through said angularly curved portion of the angularly extending end of said blade and through the end of said slot in said body near one end of the body to locate the longitudinal axis of said blade in offset lateral relation to said screw near one end of said body of said instrument.

HARRY DUNREATH RICHARDSON.

References Cited in the file of this patent

UNITED STATES PATENTS

| Number | Name | Date |
|---|---|---|
| 140,055 | Marston | June 17, 1873 |
| 143,595 | Shoff | Oct. 14, 1873 |
| 143,942 | Thornley | Oct. 21, 1873 |
| 144,003 | Waterbury | Oct. 28, 1873 |
| 196,234 | Kitchin | Oct. 16, 1877 |
| 527,815 | Schnell | Oct. 23, 1894 |
| 593,608 | Rosenkranz | Nov. 16, 1897 |
| 636,191 | Wright | Oct. 31, 1899 |
| 847,720 | Barbo | Mar. 19, 1907 |
| 1,223,974 | Helden | Apr. 24, 1917 |
| 1,311,423 | Shurter | July 29, 1919 |
| 1,691,118 | Lissy | Nov. 13, 1928 |
| 1,701,069 | Frantz | Feb. 5, 1929 |
| 1,934,096 | Shimp | Nov. 7, 1933 |
| 2,399,303 | Thomas | Apr. 30, 1946 |

FOREIGN PATENTS

| Number | Country | Date |
|---|---|---|
| 497,450 | Great Britain | Dec. 20, 1938 |